(12) United States Patent
Cahill

(10) Patent No.: US 8,577,318 B2
(45) Date of Patent: Nov. 5, 2013

(54) COMMUNICATIONS SYSTEM DENSITY AND RANGE IMPROVEMENT BY SIGNAL-STRENGTH-DIRECTED CHANNEL CLASS SELECTION WITH WEIGHTING FOR MINIMUM CAPACITY CONSUMPTION

(75) Inventor: Stephen Cahill, Felton, CA (US)

(73) Assignee: Plantronics, Inc., Santa Cruz, CA (US)

( * ) Notice: Subject to any disclaimer, the term of this patent is extended or adjusted under 35 U.S.C. 154(b) by 480 days.

(21) Appl. No.: 12/782,940

(22) Filed: May 19, 2010

(65) Prior Publication Data

US 2011/0287795 A1 Nov. 24, 2011

(51) Int. Cl.
*H04B 17/00* (2006.01)
(52) U.S. Cl.
USPC ..................... 455/226.1; 455/67.11
(58) Field of Classification Search
USPC ............. 455/226.1–226.4, 513, 67.11–67.13, 455/452.1
See application file for complete search history.

(56) References Cited

U.S. PATENT DOCUMENTS

| | | | | |
|---|---|---|---|---|
| 5,412,650 | A * | 5/1995 | Davies | 370/347 |
| 6,018,663 | A * | 1/2000 | Karlsson et al. | 455/513 |
| 6,512,752 | B1 * | 1/2003 | H'mimy et al. | 455/513 |
| 7,113,782 | B2 * | 9/2006 | Lucidarme | 455/452.1 |
| 8,036,671 | B2 * | 10/2011 | Furuskar et al. | 455/509 |
| 2004/0266358 | A1 * | 12/2004 | Pietraski et al. | 455/67.11 |
| 2007/0026810 | A1 * | 2/2007 | Love et al. | 455/67.11 |
| 2007/0054682 | A1 * | 3/2007 | Fanning et al. | 455/509 |
| 2009/0168763 | A1 * | 7/2009 | Choi | 370/352 |
| 2009/0316805 | A1 * | 12/2009 | Miao et al. | 455/226.1 |
| 2011/0086661 | A1 * | 4/2011 | Yamamoto et al. | 455/513 |

* cited by examiner

*Primary Examiner* — Lana N Le
(74) *Attorney, Agent, or Firm* — Chuang Intellectual Property Law

(57) ABSTRACT

Methods and apparatuses for optimized channel selection are disclosed. In one example, a channel quality is measured of each channel of an available number of channels on which a mobile communication device can transmit and receive. A subset of the available number of channels is allocated to a long range channel class responsive to the channel quality. An RSSI of the mobile communication device is monitored and correlated to a mobile communication device proximity to a base station. A channel is selected from the long range channel class if the mobile communication device proximity is greater than a predetermined proximity.

6 Claims, 7 Drawing Sheets

COMMUNICATIONS SYSTEM DENSITY AND RANGE IMPROVEMENT BY SIGNAL-STRENGTH-DIRECTED CHANNEL CLASS SELECTION WITH WEIGHTING FOR MINIMUM CAPACITY CONSUMPTION

BACKGROUND OF THE INVENTION

Radio communication systems have limitations with respect to the number of users which can be active in a given geographic area. The limitations depend on the size of the geographic area, the propagation losses in the area, the statistics for usage-period duration and interval, any system-idle background usage, and the radio communication system physical parameters.

How particular types of radio systems handle too many users varies. In one prior art digital enhanced cordless telecommunications (DECT) system, in cases where usage is carrier-to-interferer limited, the system may offer reduced range for acceptable audio quality. Alternatively, the system may refuse to allow new links to be established in cases where usage for a particular channel and timeslot combination is allowed only if interference in that combination is lower than a threshold, and that threshold is exceeded by the propagating interfering signal from a not-so-distant user in another communications link.

The density of users the system can handle trades off with range due to other-user interference imposing a noise floor for the radio signal's SNR. In the prior art, a variety of attempts to address the range vs. density problem have been tried. In one prior art attempt, the transmit power of the unit is adjusted in response to the received signal level. For this approach, at strong received signal levels the transmit signal is reduced. The success of this approach is limited by the fact that if the individual units are interference-limited in range even at low power, and for a system where all units are at the same power level, it does not matter what the actual power level is, as the receiver's signal-to-interference level is the same. Units which are at a range where they are no longer at low power are a degradation to the all-units-at-the-same-power case. Adjusting transmit power in response to received signal level works to improve density only if most units adjust their transmit power downwards far enough that range is limited by signal-to-thermal-noise rather than signal-to-interference. This is commonly not the case for a non-line-of-sight environment such as a head-worn product where the user can shadow the antenna path between the base and headset even at close range.

As a result, improved methods and apparatuses for improved range and density are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
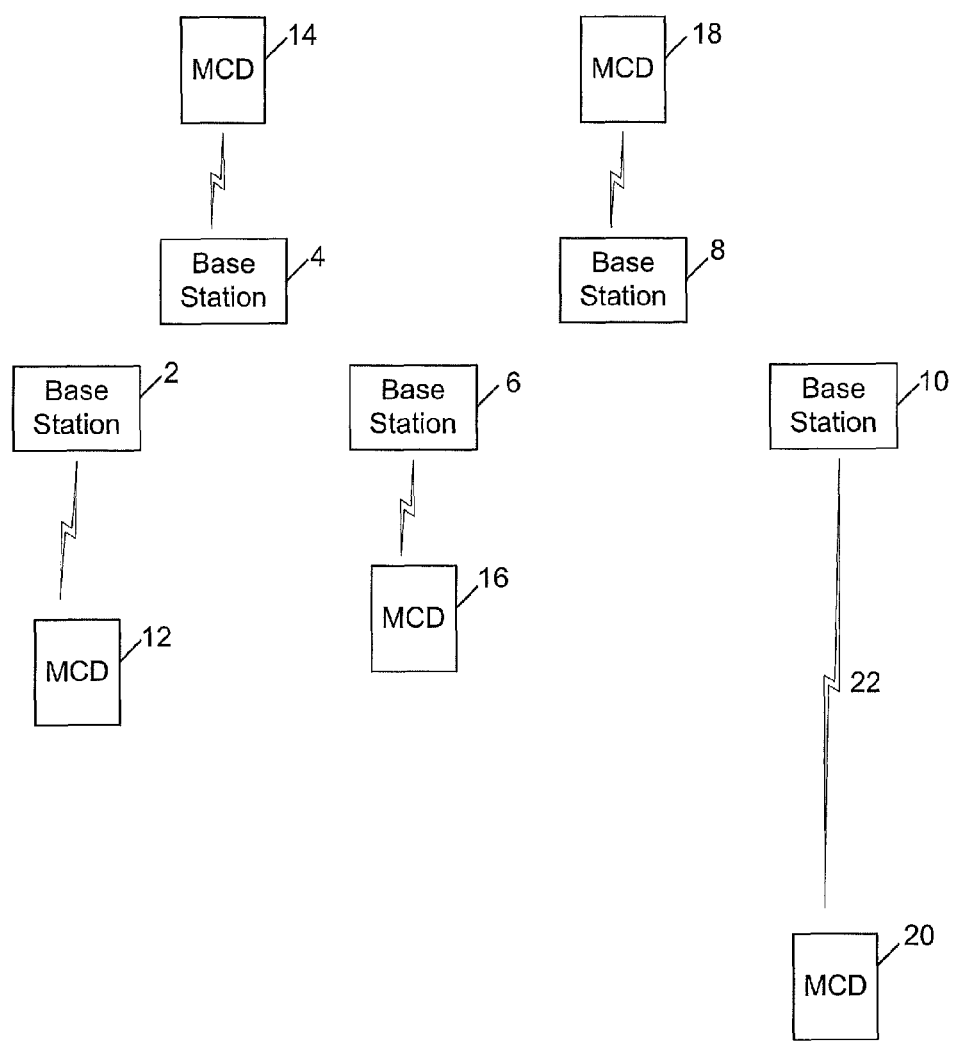
FIG. 1 illustrates a radio communication system with multiple base stations and mobile communication devices.

Methods and apparatuses for radio system channel selection are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to optimized channel selection in ensemble radio communication systems whose capacity to provide user-density is finite. In the prior art, it is common for systems to choose the least interfered channel when selecting a channel and timeslot to operate in. This ensures that each additional user in a dense system gets an equal amount of the available capacity. The inventor has recognized that users don't need equal amounts of capacity: an individual unit which is being operated at close range does not need as much capacity as a unit which is being operated at long range, capacity being a function of bandwidth needed and available radio channel signal-to-interference ratio. Optimum density is instead achieved by each unit consuming only as much capacity as it needs.

Methods and systems are described for optimized management of a radio communications system consisting of multiple users in an environment where user-density is large enough to limit range, but where not all users need long-range communications at the same time. In one example, a density installation consists of multiple timeslotted communications systems incorporating shared multiple channels but with asynchronous-from-unit-to-unit timeslotting. The units select operating channels and timeslots from time to time based on some channel selection algorithm, commonly based on the observation of existing interference, the algorithm segregating a group of channels from the total available designated for the purpose of description as the long range class channels. Individual units select to not use channels from the segregated long range channel class unless the observed received signal strength indication (RSSI) for the desired communications signal received from the other end of the communications link would indicate that the unit is at long range from the other end of the communications link.

In one implementation, the sample-to-sample variation of RSSI is analyzed in addition to its average or instant level so as to attempt to further qualify range, where the RSSI is more variable sample-to-sample when range increases. For longer propagation paths, even if it should happen that a set of samples in an average are higher than would be normally indicated for a long range due to statistical variation, the RSSI has a larger average variance.

In one implementation, certain channels are optimized for long-range use by having units from time to time observe the other-user (interference signal) RSSI on channels in a preference order rather than grouped as "long range class" or "not long range class". A channel is selected for use by using both the desired-service RSSI value with the ranked observed interference RSSI on the available channels, and selecting a channel and timeslot based on the preference order and the observed interference RSSI and the observed desired-service RSSI such that the channel and timeslot selected is the first channel in the preference order having an available timeslot which will offer acceptable performance for the measured desired-service and interference-service levels. In this manner, channels at the end of the preference order are automatically made available for users who need long range, each radio unit having selected a channel for which that unit's communications link does not use capacity available to the ensemble of units in excess of that unit's communications link's needs. In this way an automatic adjustment of the size of the long range class allocation of channels occurs as individual units change range, and neither long range nor short-range units experience an unbalanced excess or deficit of available capacity.

Thus, channel selection is optimized so that cleaner channels (channels with lower interference levels) are available for some users to get long range with. Users who don't need the cleanest channels are packed together in some channels where there will be higher interference, but interference is not an issue because these users are not operating at long range. This then leaves some channels with reduced interference available for users who do need long range. Having systems being operated at short-range choose channels where there is just low enough interference to operate properly assures that other channels can be free for long-range use.

In one example usage implementation, this allows units to be operated at the maximum DECT range in an area which is close to but not at the density limit for systems operating at short range. For example, in the prior art, only short "in cubicle" range for density applications may be offered even though roaming ten to twenty times that short range is possible if the channel is clean. There are no available clean channels in a density installation where each new unit chooses the cleanest available though, so delivered range in a density installation is short. Adopting the methods and systems described herein allows long-range service even in a dense installation where the number of long-range users is small relative to the total number of users. In one example, small being, for the case of DECT 6.0, $\frac{1}{5}^{th}$ of the total non-frequency-reusing users in a reuse area, for instance, with a single channel in a designated long range class.

In one example, a method of channel selection for a mobile communication device includes measuring a channel quality of each channel of an available number of channels on which the mobile communication device can transmit and receive. A subset of the available number of channels is allocated to a long range channel class responsive to the channel quality. The method includes monitoring an RSSI for the desired communications link of the mobile communication device, and correlating the desired-signal RSSI of the mobile communication device to a mobile communication device's proximity to a base station. A channel is selected from the long range channel class if the mobile communication device proximity is greater than a predetermined proximity.

In one example, a method of channel selection for a mobile communication device includes periodically performing a channel quality measurement for each channel of an available number of communication channels and monitoring desired and undesired signal RSSIs at the mobile communication device. The lowest quality channel satisfying a predetermined required signal to interference ratio is identified utilizing the desired and undesired signal RSSIs at the mobile communication device and the channel quality measurement for each channel. The lowest quality channel satisfying the predetermined required signal to interference ratio is selected.

In one example, a mobile communication device includes a processor, a transceiver, and an antenna. The mobile communication device includes a memory storing a channel selection optimization application configured to allocate a subset of available channels to a long range channel class, where the channel selection optimization application is configured to select the channel from the long range channel class if the mobile communication device desired-signal RSSI indicates the mobile communication device is at long range. For example, the mobile communication device may be a headset having a DECT transceiver where the selectable channels are DECT channels.

In one example, a mobile communication device includes a processor, a transceiver, an antenna, and a memory storing a channel selection optimization application configured to identify a lowest quality channel satisfying a predetermined required signal to interference ratio utilizing the RSSI of the mobile communication device and a channel quality measurement for each available channel of an available number of channels.

FIG. 1 illustrates a radio communication system 100 with multiple base stations and mobile communication devices in one example. The radio communication system 100 may, for example, be implemented in a telephone call center or an office environment having a high density of users. Base station 2, base station 4, base station 6, base station 8, and base station 10 are in radio communication with mobile communication device 12, mobile communication device 14, mobile communication device 16, mobile communication device 18, and mobile communication device 20, respectively.

In one example, radio communication system 100 is a TDMA system, such as that utilized by the DECT protocol. In general, a carrier frequency in a frequency band is used by a base station in radio contact with a mobile communication device. For example, a base station 10 transmits to a mobile communication device 20 in a transmit time slot in a first frame on a selected carrier frequency. The mobile communication device 20 transmits to the base station 10 in a receive time slot in a second frame on the same selected carrier frequency. Thus, during transmit time slots, base station 10 acts as a transmitter and during receive time slots base station 10 operates as a receiver. The first frame and the second frame taken together form a duplex frame.

Base stations 2, 4, 6, 8, and 10 may, for example, be a landline phone, access point (AP), personal computer, USB dongle, or mobile phone. Base stations 2, 4, 6, 8, and 10 are coupled to a telecommunications network. The network may be a communications network which may include a public switched telephone network (PSTN), a cellular network, an integrated services digital network (ISDN), a local area network (LAN), and/or a wireless local area network (WLAN), that support standards such as Ethernet, 802.11, and/or voice over internet protocol (VoIP).

In one example, the access point includes a transceiver and a processor configured to allow a wireless device (e.g., one of the mobile communication devices 12, 14, 16, 18, and 20)

access to a network connected to the access point (e.g., via a 10/100 Ethernet RJ-45 port). The access point may be any device that allows wireless-equipped computers and other devices to communicate with a wired network. In one example, the access point is able to support the 802.11a, 802.11b, and/or 802.11g wireless networking standards. In other examples, the access point may be able to support other wireless networking standards.

The received signal strength indicator (RSSI) of other-user and desired-signal wireless links 22 are measured and monitored over time and processed to determine which channel to operate the mobile communication device 20. The RSSI measurements can be monitored either at the mobile communication device 20 or at the base station 10, or both. If measured and monitored at the base station 10, the mobile communication device 20 can be configured to query the base station 10 as to what the interference-signal and desired-signal RSSIs are. If measured and monitored at the mobile communication device 20, the base station 10 can be configured to query the mobile communication device 20 as to what the interference-signal and desired-signal RSSIs are. In one example, the RSSI measurements are processed at the mobile communication device 20 to determine the appropriate mobile communication device channel. In a further example, the RSSI measurements are processed at the base station 10 to determine the appropriate mobile communication device channel.

Figure 2:
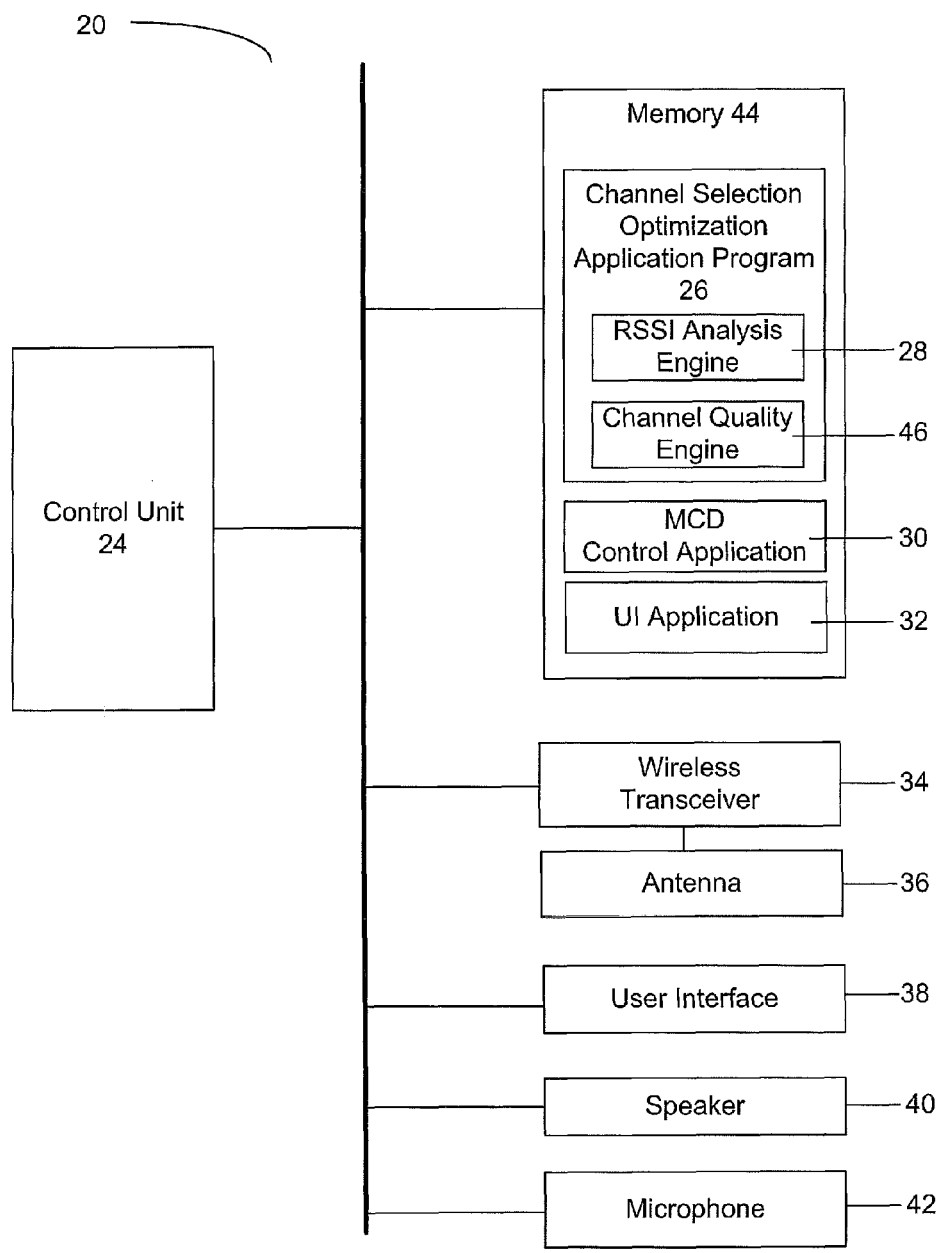
FIG. 2 illustrates a simplified block diagram of a mobile communication device.

FIG. 2 illustrates a simplified block diagram of a mobile communication device with optimized channel selection. Referring to FIG. 2 in conjunction with FIG. 1, a block diagram of an example of mobile communication device 20 is shown. Mobile communication device 20 includes a control unit 24 operably coupled to a memory 44, a wireless transceiver 34 using an antenna 36, a user interface 38, a speaker 40, and a microphone 42. In one example, wireless transceiver 34 is a DECT transceiver implementing DECT 6.0.

Control unit 24 allows for processing data, in particular managing RSSI data between wireless transceiver 34 and memory 44 for determining which channel to operate mobile communication device 20. In one example, control unit 24 is a high performance, highly integrated, and highly flexible system-on-chip (SOC) having signal processing functionality. Control unit 24 may include a variety of processors (e.g., digital signal processors), with conventional CPUs being applicable.

Memory 44 may include a variety of memories, and in one example includes SDRAM, ROM, flash memory, or a combination thereof. Memory 44 may further include separate memory structures or a single integrated memory structure. In one example, memory 44 may be used to store passwords, network and telecommunications programs, and/or an operating system (OS). Memory 44 includes a mobile communication device control application 30 and a user interface application 32. User interface 38 allows for manual communication between the device user and the device, and in one example includes an audio and/or visual interface such that a prompt may be provided to the user's ear and/or an LED may be lit.

Memory 44 stores an channel selection optimization application program 26 executed by control unit 24 to determine the operating channel of the mobile communication device 20. Channel selection optimization application program 26 includes an RSSI analysis engine 28 and channel quality engine 46.

Channel quality engine 46 is configured to measure the quality of each available channel on which the mobile communication device 20 can transmit and receive data. In one example, the channel quality engine 46 is configured to monitor the interference level of each channel. A constant scan is performed for interference levels for each time slot and for each carrier. In the DECT band, the process of scanning carriers for interference levels is set forth in the DECT regulatory protocol. In this TDMA system with 10 msec transmit framing, within the transmit frame there are twenty four time slots, with twelve for transmit and twelve for receive. For any individual time slot interference levels in both bands are scanned. In one example, a table of interference levels is created.

In one example, the channel selection optimization application program 26 is configured to monitor a proximity utilizing an RSSI value associated with a wireless signal received at wireless transceiver 34. Responsive to the proximity and the measured quality of the available channels, the channel selection optimization application program 26 selects an appropriate channel. For example, the proximity is a proximity between the mobile communication device 20 and the base station 10. In one example, the proximity is a predetermined proximity delineating a short range status (e.g., near status) or a long range status (e.g., far status) of the mobile communication device 20 from the base station 10.

Utilizing RSSI analysis engine 28, channel selection optimization application program 26 is operable to process a plurality of RSSI values. In one example, a time weighted average of RSSI values is identified and compared to a threshold RSSI to determine proximity. Memory 44 may store RSSI values and predetermined threshold RSSI values for use by channel selection optimization application program 26 to determine the proximity utilized in determining the operating channel of mobile communication device 20. The channel selection optimization application program 26 may implement a variety of algorithms to process the RSSI data and select the desired channel.

In one example, the channel selection optimization application program 26 is configured to allocate a subset of available channels to a long range channel class, where the channel selection optimization application program 26 is configured to select the channel from the long range channel class if the mobile communication device RSSI indicates the mobile communication device 20 is at long range. For example, the mobile communication device 20 may be a headset having a DECT transceiver where the selectable channels are DECT channels. Where the DECT transceiver implements DECT 6.0, the available number of channels is five.

In one example, the mobile communication device RSSI indicates the mobile communication device 20 is at long range if the mobile communication device desired-signal RSSI is below a threshold RSSI. The threshold RSSI is associated with a predetermined desired proximity between the mobile communication device 20 and the mobile communication device base station 10. In a further example, the channel selection optimization application program 26 is configured to determine if the mobile communication device RSSI indicates the mobile communication device 20 is at long range in part by observing a sample to sample variation of the mobile communication device desired-signal RSSI.

In one example, the channel selection optimization application program 26 is configured to rank the available channels in order of quality and allocate a predetermined number of channels having the highest quality to the long range channel class. In one example, the channel selection optimization application program 26 is configured to allocate a subset of the available number of channels to a short range channel class, where each channel of the available number of channels is allocated to either the short range channel class or the long range channel class.

In a further example, the channel selection optimization application program 26 is configured to identify a lowest quality channel satisfying a predetermined required signal to noise ratio utilizing the desired-signal and undesired interference-signal RSSIs at the mobile communication device 20 and a channel quality measurement for each available channel of an available number of channels.

In one example, the channel selection optimization application program 26 is further configured to order the available number of channels in a preference order list based on the channel quality measurement, the channels ranked from lowest quality to highest quality. The channel selection optimization application program 26 identifies a lowest quality channel satisfying a predetermined required signal to noise ratio by computing a measure of the desired-signal and interference-signal RSSIs and comparing the result of the computation to the channel quality measurement for each channel in the preference order list in increasing order from lowest quality to highest quality.

Figure 3:
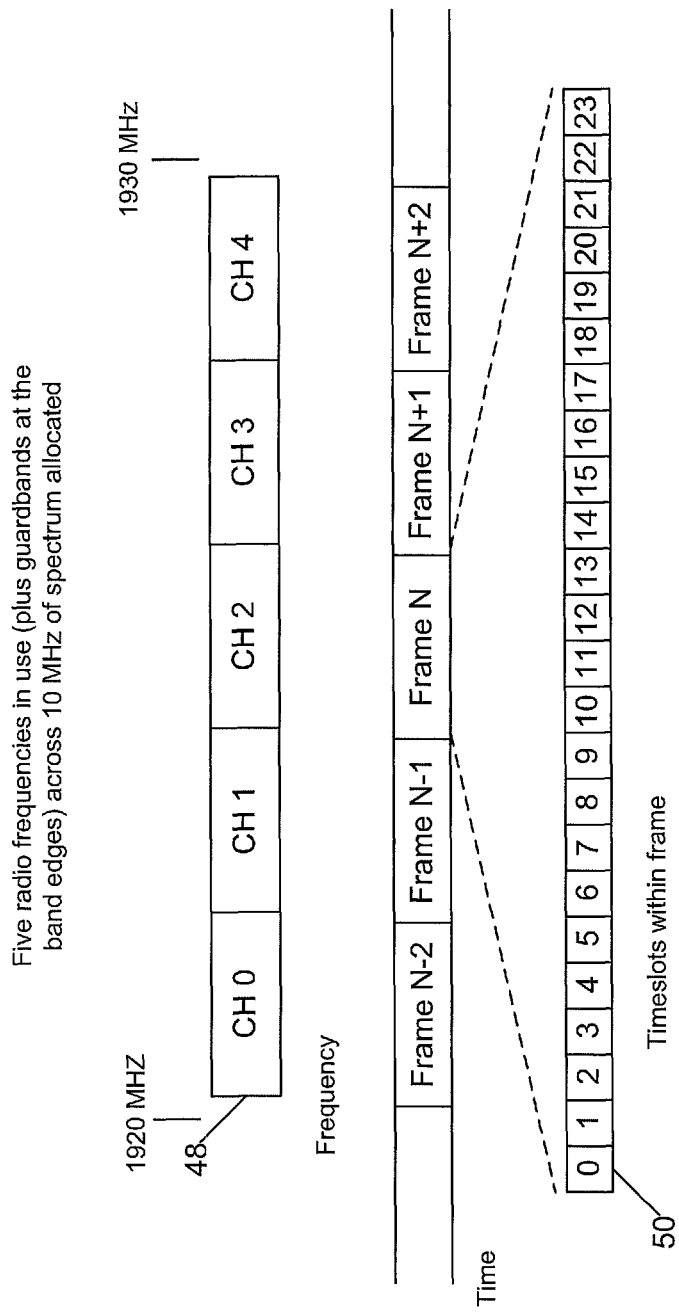
FIG. 3 illustrates an FCC part 15 subpart D-compliant DECT 6.0 channel and frame structure in one example.

FIG. 3 illustrates a DECT channel and frame structure in one example. In the example illustrated in FIG. 3, a United States DECT 6.0 system is illustrated. There are five channels 48 having 1,728 kHz spacing available for use by the system, channels CH0, CH1, CH2, CH3, and CH4. The frequency band of operation is 1920 MHz-1930 MHz. One of ordinary skill in the art will recognize that where other DECT systems are utilized, such as those in Europe, these figures will vary. For example, in Europe, ten carriers are utilized in the frequency band 1880 MHz-1900 MHz. There are twenty four timeslots 50 per frame, including twelve time slots in a down link direction (i.e., base station 10 to mobile communication device 20) followed by twelve slots for the up link direction (i.e., mobile communication device 20 to base station 10). A timeslot 50 is 416.7 microseconds long, or 480 bit periods where the instantaneous data rate is 1.152 Mbits/sec.

Figure 4:
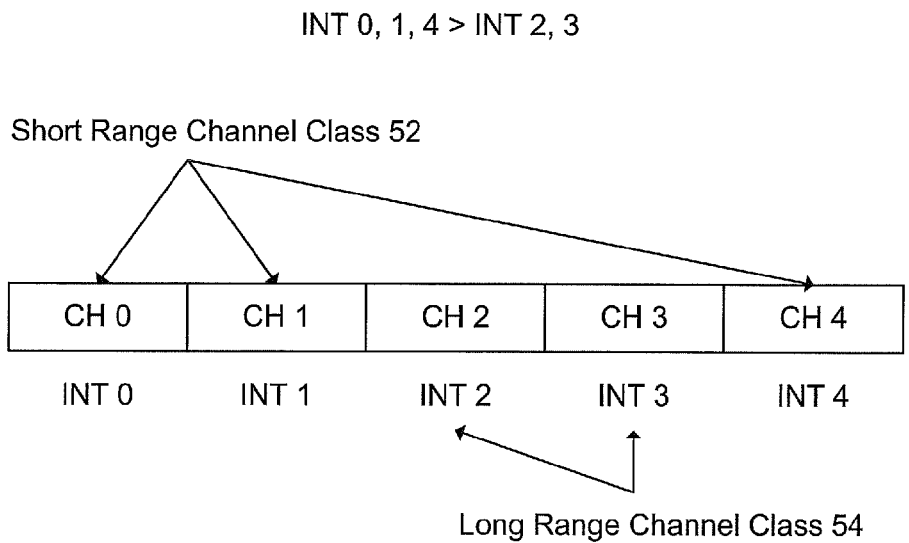
FIG. 4 illustrates assignment of a subset of channels to a long range channel class in one example.

FIG. 4 illustrates assignment of a subset of channels to a long range channel class in one example. Channel CH 0 has a measured interference INT 0, channel CH 1 has a measured interference INT 1, channel CH 2 has a measured interference INT 2, channel CH 3 has a measured interference INT 3, and channel CH 4 has a measured interference INT 4.

In this example, interference NT 0, INT 1, and INT 4 are the highest interference levels and interference INT 2 and INT 3 are the lowest interference levels. As a result, channel CH 2 and channel CH 3 are allocated to a long range channel class 54, and channel CH 0, channel CH 1, and channel CH 4 are allocated to a short range channel class 52. In a further example, short range channel class 52 may be subdivided into additional channel classes.

Figure 5:
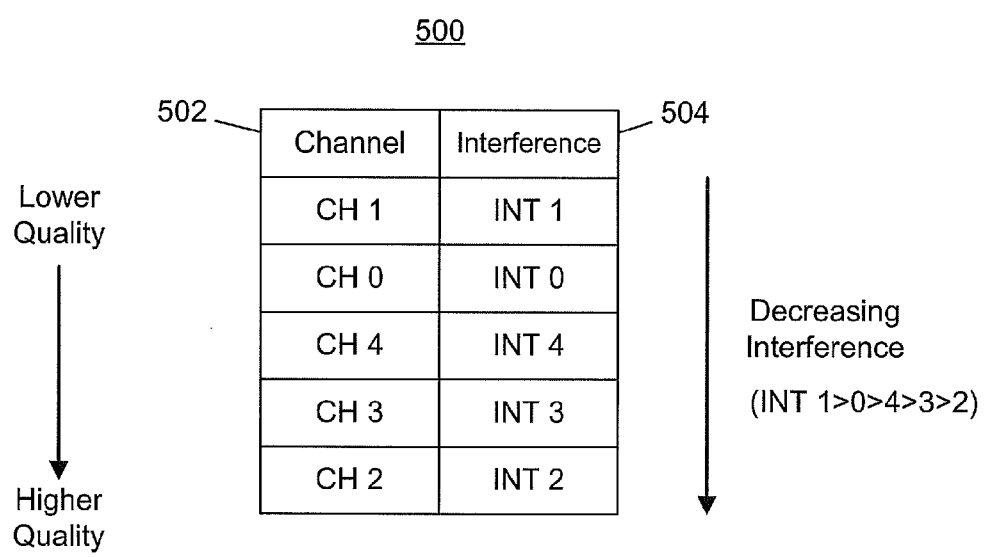
FIG. 5 illustrates ranking available channels in an ordered preference list based on noise level.

FIG. 5 illustrates ranking available channels in an ordered preference list based on noise level. In the example shown in FIG. 5, a lookup table 500 has been generated containing an ordered list of channels 502 and their associated interference level 504. The lookup table 500 is ordered based on the measured interference 504 of each channel 502. The channels are ordered from lower quality to a higher quality, with the channels having the lowest noise appearing at the bottom of lookup table 500.

Channel CH 0 has a measured interference INT 0, channel CH 1 has a measured interference INT 1, channel CH 2 has a measured interference INT 2, channel CH 3 has a measured interference INT 3, and channel CH 4 has a measured interference INT 4. In the example shown in FIG. 5, INT 1>INT 0>INT 4>INT 3>INT 2. As a result, the channels appear in lookup table 500 in the order CH 1, CH 0, CH 4, CH 3, and CH 2.

Figure 6:
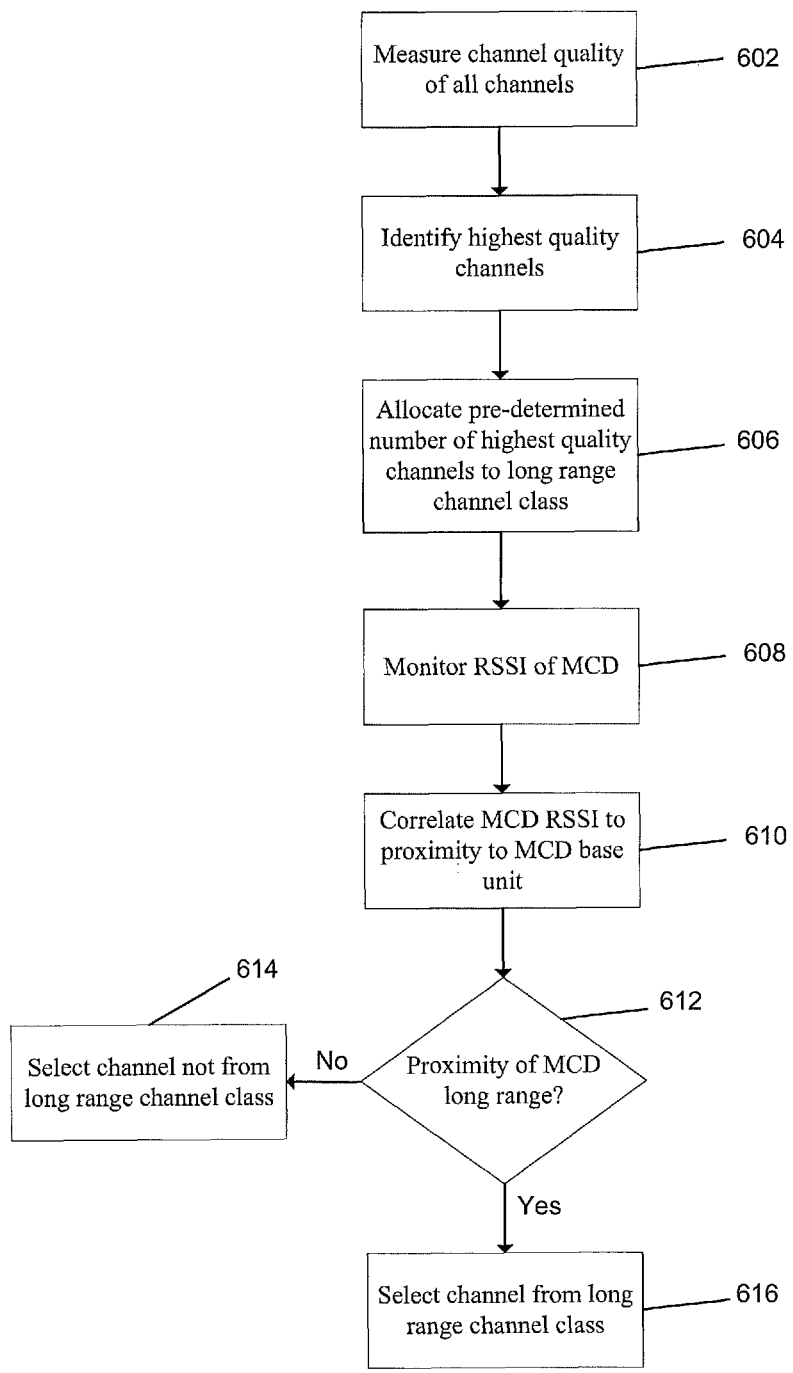
FIG. 6 is a flow diagram illustrating a channel selection process for a mobile communication device in one example.

FIG. 6 is a flow diagram illustrating a channel selection process for a mobile communication device in one example. At block 602, the channel quality of all channels is measured. At block 604, the highest quality channels are identified. At block 606, a predetermined number of highest quality channels are allocated to a long range channel class. In one example, allocating a subset of the available number of channels to a long range channel class responsive to the channel quality comprises ranking the channels in order of quality and allocating the predetermined number of channels having the highest quality to the long range channel class. In one example, the method further includes allocating a subset of the available number of channels to a short range channel class, wherein each channel of the available number of channels is allocated to either the short range channel class or the long range channel class.

At block 608, the desired-signal RSSI of the mobile communication device is monitored. At block 610, the mobile communication device's desired-signal RSSI is correlated to a proximity to the mobile communication device base unit. In one example, correlating the desired-signal RSSI of the mobile communication device to a mobile communication device proximity to a base station comprises observing a sample to sample variation of RSSI. In one example, correlating the RSSI of the mobile communication device to a mobile communication device proximity to a base station comprises comparing the RSSI to a predetermined threshold RSSI.

At decision block 612, it is determined whether the proximity of the mobile communication device is a long range status. The mobile communication device is at long range status if it is greater than a predetermined proximity from the base station. If yes at decision block 612, at block 616 a channel is selected from the long range channel class of channels. If no at decision block 612, at block 614 a channel is selected not from the long range channel class.

Figure 7:
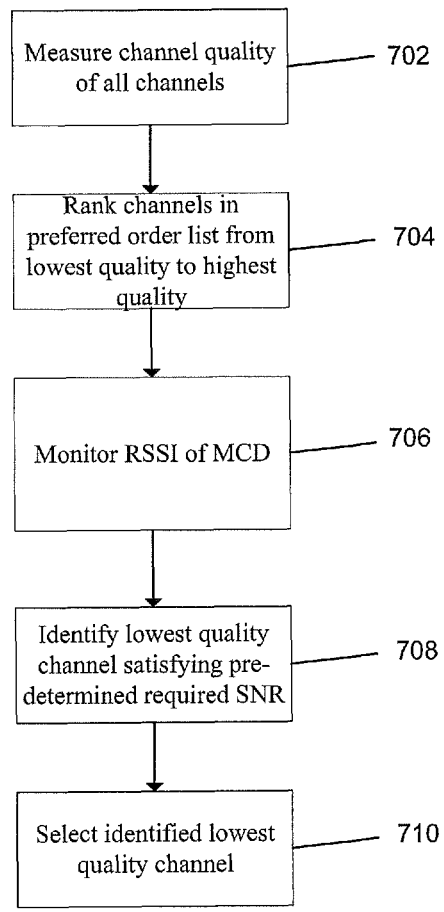
FIG. 7 is a flow diagram illustrating a channel selection process for a mobile communication device in a further example.

FIG. 7 is a flow diagram illustrating a channel selection process for a mobile communication device in a further example. At block 702, the channel quality of all channels is measured. The channel quality measurement includes measuring a noise level for each channel periodically. This noise level may include interference caused by other DECT users and may be indicated by other-user RSSI.

At block 704, the channels are ranked in a preferred order list from lowest quality to highest quality. In a further example, the channels are ranked from highest quality to lowest quality as shown in FIG. 5. At block 706, the interference-signal and desired-signal RSSIs at the mobile communication device are monitored. At block 708, the lowest quality channel satisfying a predetermined required signal to interference ratio is identified. For example, identifying the lowest quality channel satisfying a predetermined required signal to interference ratio involves comparing a measure of the desired-signal RSSI relative to the interference-signal RSSI as a channel quality measurement for each channel in the preference order list in increasing order from lowest quality to highest quality. At block 710, this identified lowest quality channel is selected.

Figure 8:
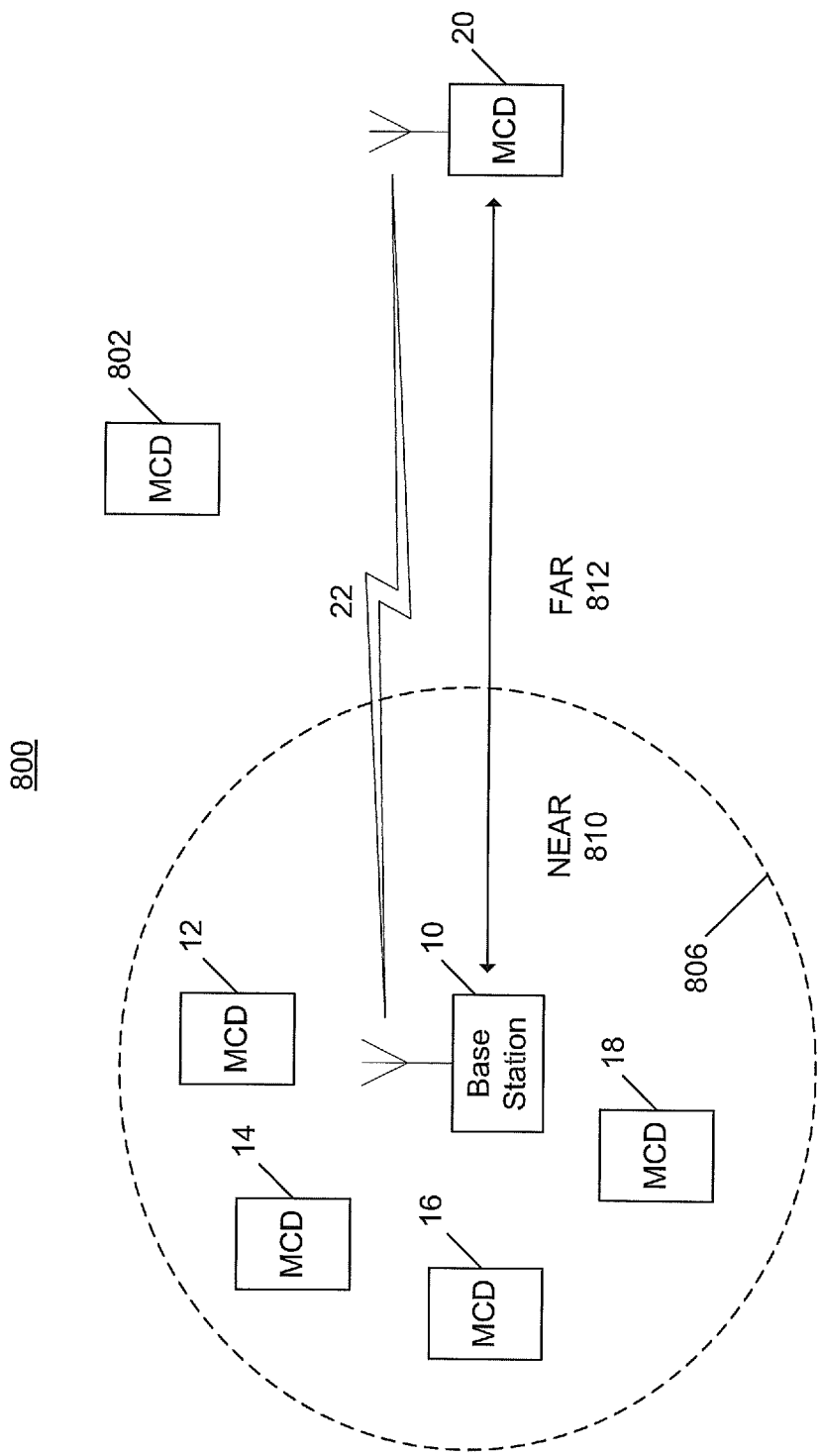
FIG. 8 illustrates a usage scenario for optimized channel selection where a mobile communication device transitions between selection of a channel from a short range channel class and a long range channel class.

FIG. 8 illustrates a usage scenario for optimized channel selection where a mobile communication device transitions between selection of a channel from a short range channel class and a long range channel class. A system 800 includes a base station 10 and mobile communication device 20 capable of wireless communication there between as previously described. The received signal strength indicator of the desired-signal wireless link 22 is measured and monitored to determine the proximity of the mobile communication device 20 from the base station 10.

In system 800, a proximity boundary 806 establishes a range from base station 10 below which mobile communication device 20 is considered to be in a NEAR state 810 and beyond which mobile communication device 20 is considered to be in a FAR state 812. System 800 utilizes RSSI values of signals received over wireless link 22 to determine whether mobile communication device 20 is in a NEAR state 810 or FAR state 812. Responsive to this NEAR/FAR determination, mobile communication device 20 selects a channel to operate at either from a short range class of channels or a long range class of channels. Available operating channels are allocated to either the short range channel class or the long range channel class by measuring interference levels in each channel as previously described.

In the example illustrated in FIG. 8, the mobile communication device 20 and mobile communication device 802 are located at a proximity greater than proximity boundary 806 and therefore select a channel from the long range class of channels. Mobile communication devices 12, 14, 16, and 18 are located at a proximity less than proximity boundary 806 and therefore select a channel from a short range class of channels. The NEAR/FAR proximity boundary 806 may be automatically configured or the user may be set by the user. For example, the user may set the NEAR/FAR proximity boundary 806 based upon the density of other mobile communication devices in the user's planned device operation area.

While the exemplary embodiments of the present invention are described and illustrated herein, it will be appreciated that they are merely illustrative and that modifications can be made to these embodiments without departing from the spirit and scope of the invention. For example, the number of channels available for use will vary depending on the radio system implementation. Where a subset of available channels are allocated to a long range channel class, the size of the subset may be varied depending upon the particular implementation. Thus, the scope of the invention is intended to be defined only in terms of the following claims as may be amended, with each claim being expressly incorporated into this Description of Specific Embodiments as an embodiment of the invention.

What is claimed is:

1. A method of channel selection for a mobile communication device comprising:
    measuring a channel quality of each channel of an available number of channels on which the mobile communication device can transmit and receive;
    allocating a subset of the available number of channels to a long range channel class responsive to the channel quality;
    monitoring an RSSI of the mobile communication device;
    correlating the RSSI of the mobile communication device to a mobile communication device proximity to a base station; and
    selecting a channel from the long range channel class if the mobile communication device proximity is greater than a predetermined proximity.

2. The method of claim 1, wherein correlating the RSSI of the mobile communication device to a mobile communication device proximity to a base station comprises observing a sample to sample variation of RSSI.

3. The method of claim 1, wherein correlating the RSSI of the mobile communication device to a mobile communication device proximity to a base station comprises comparing the RSSI to a predetermined threshold RSSI.

4. The method of claim 1, wherein the mobile communication device transmits and receives on the channel selected utilizing a DECT protocol, the channel between the mobile communication device and a DECT base station operating independently from other DECT base stations.

5. The method of claim 1, wherein allocating a subset of the available number of channels to a long range channel class responsive to the channel quality comprises ranking the channels in order of quality and allocating a predetermined number of channels having a highest quality to the long range channel class.

6. The method of claim 1, further comprising:
    allocating a subset of the available number of channels to a short range channel class, wherein each channel of the available number of channels is allocated to either the short range channel class or the long range channel class.

* * * * *